(12) United States Patent
Sakashita et al.

(10) Patent No.: US 8,108,015 B2
(45) Date of Patent: Jan. 31, 2012

(54) ELECTRONIC APPARATUS AND ENCLOSURE THEREFOR

(75) Inventors: Hiroaki Sakashita, Kawasaki (JP);
Yoshifumi Kajiwara, Kawasaki (JP);
Takehisa Ishikawa, Kawasaki (JP);
Yoshiya Matsumoto, Kawasaki (JP);
Kazunori Murayama, Kawasaki (JP);
Atsuko Yamamoto, Kawasaki (JP);
Hiroyuki Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 833 days.

(21) Appl. No.: 11/955,574

(22) Filed: Dec. 13, 2007

(65) Prior Publication Data
US 2008/0146296 A1      Jun. 19, 2008

(30) Foreign Application Priority Data
Dec. 15, 2006    (JP) ................................ 2006-338586

(51) Int. Cl.
*H04M 1/00*            (2006.01)

(52) U.S. Cl. ................. 455/575.3; 455/571.1; 455/90.3; 455/575.4; 455/575.8; 362/24; 362/88; 362/29; 340/815.4; 340/815.42; 340/815.5; 340/815.45

(58) Field of Classification Search ............... 455/575.3, 455/575.1, 575.4, 575.8, 90.3; 362/88, 24, 362/29–30; 340/815.4, 815.5, 815.42, 815.45
See application file for complete search history.

(56) References Cited

U.S. PATENT DOCUMENTS

| | | | | |
|---|---|---|---|---|
| 6,254,249 B1 * | 7/2001 | Kim et al. | .................... | 362/109 |
| 6,731,913 B2 * | 5/2004 | Humphreys et al. | ......... | 455/90.3 |
| 6,766,181 B1 * | 7/2004 | Newman et al. | ........... | 455/575.3 |
| 7,002,073 B2 * | 2/2006 | Lai et al. | ......................... | 174/50 |
| 7,072,624 B2 * | 7/2006 | Zheng et al. | ................. | 455/90.3 |
| 7,092,626 B2 * | 8/2006 | Hirai | .............................. | 396/176 |
| 7,099,709 B2 * | 8/2006 | Hsu et al. | ................... | 455/575.8 |
| 7,174,195 B2 * | 2/2007 | Nagamine | ................. | 455/575.3 |
| 7,181,255 B2 * | 2/2007 | Qin et al. | .................... | 455/575.1 |
| 7,184,718 B2 * | 2/2007 | Newman et al. | ............. | 455/90.3 |
| 7,224,946 B2 * | 5/2007 | Kubo et al. | .................. | 455/90.3 |
| 7,336,781 B2 * | 2/2008 | Hu et al. | ................. | 379/433.11 |
| 7,363,060 B2 * | 4/2008 | Bernhart et al. | ............. | 455/567 |
| 7,366,555 B2 * | 4/2008 | Jokinen et al. | ............. | 455/575.8 |
| 7,432,822 B2 * | 10/2008 | Suzuki et al. | .............. | 340/815.4 |
| 7,447,532 B2 * | 11/2008 | Hsu | ............................. | 455/575.8 |

(Continued)

FOREIGN PATENT DOCUMENTS

JP       07-273846 A      10/1995

(Continued)

OTHER PUBLICATIONS

Japanese Office Action dated Nov. 16, 2010, issued in corresponding Japanese Patent Application No. 2006-338586.

*Primary Examiner* — Marceau Milord
(74) *Attorney, Agent, or Firm* — Westerman, Hattori, Daniels & Adrian, LLP (57) ABSTRACT

An enclosure for an electronic apparatus includes an enclosure body defining an opening. The enclosure allows a panel member to cover over the opening from the outside of the enclosure body. One is allowed to design the panel member regardless of the shape of the opening. This results in a widened variety of design for the enclosure body, namely the enclosure for an electronic apparatus. The enclosure is thus allowed to enjoy an enhanced appearance.

10 Claims, 7 Drawing Sheets

U.S. PATENT DOCUMENTS

| | | | |
|---|---|---|---|
| 7,507,044 B2 * | 3/2009 | Kemppinen | 400/489 |
| 7,565,183 B2 * | 7/2009 | Vance et al. | 455/575.1 |
| 7,599,709 B2 * | 10/2009 | Kim | 455/550.1 |
| 7,660,560 B2 * | 2/2010 | Zuo et al. | 455/90.3 |
| 7,673,998 B2 * | 3/2010 | Yamamoto et al. | 362/88 |
| 7,853,299 B2 * | 12/2010 | Kang et al. | 455/575.3 |
| 2006/0063570 A1 * | 3/2006 | Nishimura | 455/575.3 |
| 2008/0076492 A1 * | 3/2008 | Yamaguchi et al. | 455/575.3 |
| 2008/0132301 A1 * | 6/2008 | Kim et al. | 455/575.3 |

FOREIGN PATENT DOCUMENTS

| | | |
|---|---|---|
| JP | 2004-007147 A | 1/2004 |
| JP | 200579607 A | 3/2005 |

* cited by examiner

FIG.8

ELECTRONIC APPARATUS AND ENCLOSURE THEREFOR

BACKGROUND OF THE INVENTION

1. Field of the Invention

The present invention relates to an electronic apparatus such as a cellular or mobile phone terminal. In particular, the present invention relates to an electronic apparatus including an infrared communication module incorporated in an enclosure body.

2. Description of the Prior Art

An infrared communication module is incorporated in the enclosure of a cellular or mobile phone terminal. The infrared communication module is utilized to realize an infrared communication. The infrared communication module includes a light-emitting element and a light-receiving element. The light-emitting element is designed to emit infrared rays to the outside of the enclosure. The light-receiving element is designed to detect infrared rays entering the enclosure from the outside. An opening is formed in the enclosure. The infrared communication module is opposed to the opening.

A panel is fitted in the opening. The panel has transparency to infrared rays so that the panel enables a selective transmission of infrared rays. The panel is fitted into the opening from the inside of the enclosure. One must design the panel depending on the shape of the opening. This results in a limited variety of the design for the panel. The mobile phone terminal should suffer from an ordinary design.

SUMMARY OF THE INVENTION

It is accordingly an object of the present invention to provide an electronic apparatus and an enclosure for an electronic apparatus, greatly serving to realize a wide variety of design for the electronic apparatus and the enclosure.

According to a first aspect of the present invention, there is provided an enclosure for an electronic apparatus, comprising: an enclosure body; an opening defined in the enclosure body; and a panel member covering over the opening from an outside of the enclosure body, the panel member having transparency to infrared rays.

The enclosure for an electronic apparatus allows the panel member to cover over the opening from the outside of the enclosure body. One is allowed to design the panel member regardless of the shape of the opening. This results in a widened variety of design for the enclosure body, namely the enclosure for an electronic apparatus. The enclosure for an electronic apparatus is thus allowed to enjoy an enhanced appearance. The panel member may have an edge curved along the contour of the end surface of the enclosure body.

The enclosure body may include: a lower half; and an upper half coupled to the lower half. The panel member may be received in a depression formed across the upper half and the lower half.

According to a second aspect of the present invention, there is provided an enclosure for an electronic apparatus, comprising: a lower half defining a surrounding wall standing upright from the periphery of a rear panel; an upper half defining a surrounding wall coupled to the lower half and an opening in the surrounding wall, the surrounding wall standing upright toward the lower half from the periphery of a front panel opposed to the rear panel; a hinge placed on the front panel; a hinge cover covering over the hinge; a pair of reinforcing plates extending from the hinge cover to the lower half, the reinforcing plates being placed on the surrounding wall of the upper half on both sides of the opening; and a panel member superposed on the reinforcing plates from the outside of the upper half for covering over the opening, the panel member having transparency to infrared rays.

When the hinge cover covers over the hinge in the enclosure for an electronic apparatus, the reinforcing plates are placed on the surrounding wall of the upper half at positions outside the opposite sides of the opening, respectively. The panel member is superposed on the reinforcing plates from the outside of the upper half. The panel member thus closes the opening. One is allowed to design the panel member regardless of the shape of the opening. This results in a widened variety of design for the enclosure body, namely the enclosure for an electronic apparatus. The electronic apparatus is thus allowed to enjoy an enhanced appearance.

The panel member may include: protrusions protruding from the back surface of the panel member; and claws each engaged with the back surface of the reinforcing plate, the claws each serving to hold the reinforcing plate against the protrusion. The reinforcing plates are held between the protrusions and the claws. The panel member may in this manner provisionally be attached to the reinforcing plates. The enclosure for an electronic apparatus may further comprise: a first claw formed in the hinge cover, the first claw inserted into the hinge; and second claws formed in the reinforcing plates, the second claws each engaged with the backside of the surrounding wall of the upper half around the top of the surrounding wall. The first and second claws allow attachment of the reinforcing plates to the upper half.

The hinge cover may be integral with the panel member based on coinjection molding. When the panel member and the hinge cover are formed as a one-piece component, the enclosure is allowed to enjoy a reduced number of components. This results in simplification in the process for production of the enclosure for an electronic apparatus. The enclosure for an electronic apparatus may further comprise: a first claw formed in the hinge cover, the first claw inserted into the hinge; and second claws formed in the reinforcing plates, the second claws each engaged with the backside of the surrounding wall of the upper half around the top of the surrounding wall. The first and second claws allow attachment of the reinforcing plates to the upper half.

According to a third aspect of the present invention, there is provided an electronic apparatus comprising: an enclosure body; an infrared communication module incorporated in the enclosure body; an opening defined in the enclosure body, the opening being opposed to the infrared communication module; and a panel member covering over the opening from the outside of the enclosure body, the panel member having transparency to infrared rays.

The panel member covers over the opening of the enclosure body from the outside of the enclosure body in the same manner as described above in the electronic apparatus. One is allowed to design the panel member regardless of the shape of the opening. This results in a widened variety of design for the enclosure body, namely the enclosure for an electronic apparatus. The enclosure for an electronic apparatus is thus allowed to enjoy an enhanced appearance. The panel member may have an edge curved along the contour of the end surface of the enclosure body.

The enclosure body may include: a lower half; and an upper half coupled to the lower half. The panel member may be received in a depression formed across the upper half and the lower half.

According to a fourth aspect of the present invention, there is provided an electronic apparatus comprising: a lower half defining a surrounding wall standing upright from the periphery of a rear panel; an upper half defining a surrounding wall coupled to the lower half and an opening in the surrounding wall, the surrounding wall standing upright toward the lower half from the periphery of a front panel opposed to the rear panel; an infrared communication module placed in a space between the lower half and the upper half, the infrared communication module being opposed to the opening; a hinge placed on the front panel; a hinge cover covering over the hinge; a pair of reinforcing plates extending from the hinge cover to the lower half, the reinforcing plates being placed on the surrounding wall of the upper half on both sides of the opening; and a panel member superposed on the reinforcing plates from the outside of the upper half for covering over the opening, the panel member having transparency to infrared rays.

When the hinge cover covers over the hinge in the electronic apparatus, the reinforcing plates are placed on the surrounding wall of the upper half at positions outside the opposite sides of the opening, respectively. The panel member is superposed on the reinforcing plates from the outside of the upper half. The panel member thus closes the opening. One is allowed to design the panel member regardless of the shape of the opening. This results in a widened variety of design for the enclosure body, namely the enclosure for an electronic apparatus. The electronic apparatus is thus allowed to enjoy an enhanced appearance.

The panel member may include: protrusions protruding from the back surface of the panel member; and claws each engaged with the back surface of the reinforcing plate, the claws each serving to hold the reinforcing plate against the protrusion. The reinforcing plates are held between the protrusions and the claws. The panel member may in this manner provisionally be attached to the reinforcing plates.

The electronic apparatus may further comprise: a first claw formed in the hinge cover, the first claw inserted into the hinge; and second claws formed in the reinforcing plates, the second claws each engaged with the backside of the surrounding wall of the upper half around the top of the surrounding wall. The first and second claws allow attachment of the reinforcing plates to the upper half.

The hinge cover may be integral with the panel member based on coinjection molding. When the panel member and the hinge cover are formed as a one-piece component, the electronic apparatus is allowed to enjoy a reduced number of components. This results in simplification in the process for production of the electronic apparatus. The electronic apparatus may further comprise: a first claw formed in the hinge cover, the first claw inserted into the hinge; and second claws formed in the reinforcing plates, the second claws each engaged with the backside of the surrounding wall of the upper half around the top of the surrounding wall. The first and second claws allow attachment of the reinforcing plates to the upper half.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
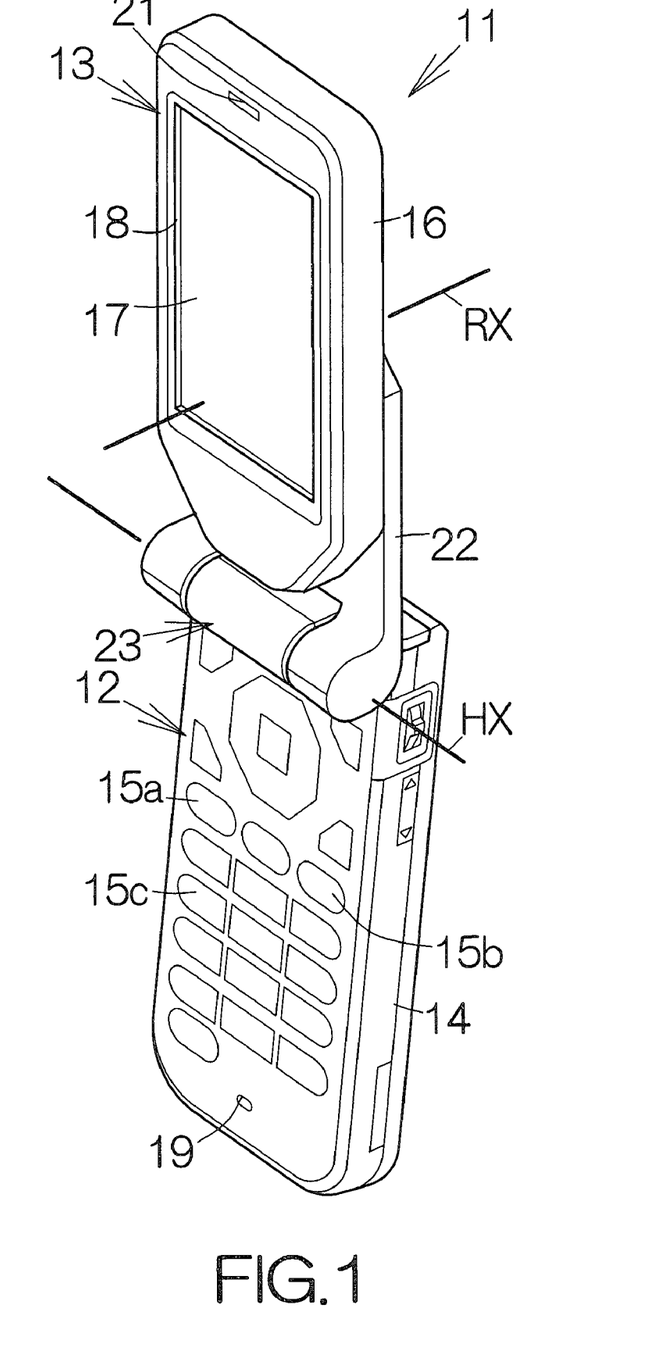
FIG. 1 is a perspective view schematically illustrating a cellular or mobile phone terminal as a specific example of an electronic apparatus according to the present invention.

FIG. 1 schematically illustrates a cellular or mobile phone terminal 11 as an example of an electronic apparatus according to an embodiment of the present invention. The mobile phone terminal 11 includes a main apparatus 12 and a display unit 13. The main apparatus 12 includes a main body enclosure 14 serving as a first enclosure. A printed circuit board, not shown, is incorporated in the main body enclosure 14. The printed circuit board will be described later. Processing circuits, such as a central processing unit (CPU) and a memory, are mounted on the printed circuit board in a conventional manner. Keypads, such as an on-hook keypad 15a, an off-hook keypad 15b, numeric keypads 15c, and the like, are embedded in the front flat surface of the main apparatus 12. The CPU execute various processing in response to the manipulation of the keypads. The main body enclosure 14 may be molded from a reinforced resin material such as acrylonitrile butadiene styrene (ABS), for example.

The display unit 13 includes a display enclosure 16 serving as a second enclosure. A flat display panel module such as a liquid crystal display (LCD) panel module 17 is incorporated in the display enclosure 16. A window opening 18 is defined in the front flat surface of the display enclosure 16. The LCD panel module 17 defines a screen exposed in the window opening 18. Various texts and graphics are displayed on the screen of the LCD panel module 17 in response to the operation of the CPU. The display enclosure 16 may be molded from a reinforced resin material such as acrylonitrile butadiene styrene (ABS), for example.

A microphone hole 19 is defined in the flat front surface of the main body enclosure 14. A microphone is placed within the microphone hole 19. A speaker hole 21 is defined in the flat front surface of the display enclosure 16. A speaker is placed within the speaker hole 21. The user of the mobile phone terminal 11 speaks to the microphone during telephone conversation. The speaker reproduces the voice of the other party.

A hinge bracket 22 is coupled to the main body enclosure 14. A hinge 23 is utilized to couple the hinge bracket 22. The hinge 23 allows relative rotation around a first rotation axis HX between the main body enclosure 14 and the hinge bracket 22. The first rotation axis HX is designed to extend in parallel with the flat front surface of the main body enclosure 14.

The back surface of the display enclosure 16 is superposed on the front surface of the hinge bracket 22. The display enclosure 16 is coupled to the hinge bracket 22 for relative rotation around a second rotation axis RX. The second rotation axis RX is designed to extend within an imaginary plane perpendicular to the first rotation axis HX. The second rotation axis RX is also designed to intersect with the front surface of the hinge bracket 22. Here, the intersecting angle is set at 90 degrees between the second rotation axis RX and the front surface of the hinge bracket 22. The display enclosure 16 is in this manner allowed to rotate relative to the main body enclosure 14 around the first rotation axis HX.

When the mobile phone terminal 11 is set in an opened attitude, the main apparatus 12 and the display unit 13 face front. A portrait screen is established in the LCD panel module 17 while the main apparatus 12 is set in a vertical attitude. The user of the mobile phone terminal 11 is allowed to look at the keypads such as the numeric keypads 15c while he/she keeps looking at the portrait screen of the LCD panel module 17. The display enclosure 16 is rotatable around the first rotation axis HX. Such a rotation of the display enclosure 16 enables superposition of the display enclosure 16 on the flat front surface of the main body enclosure 14. The mobile phone terminal 11 thus takes a closed attitude. The mobile phone terminal 11 is set in a folded state in this manner.

Figure 2:
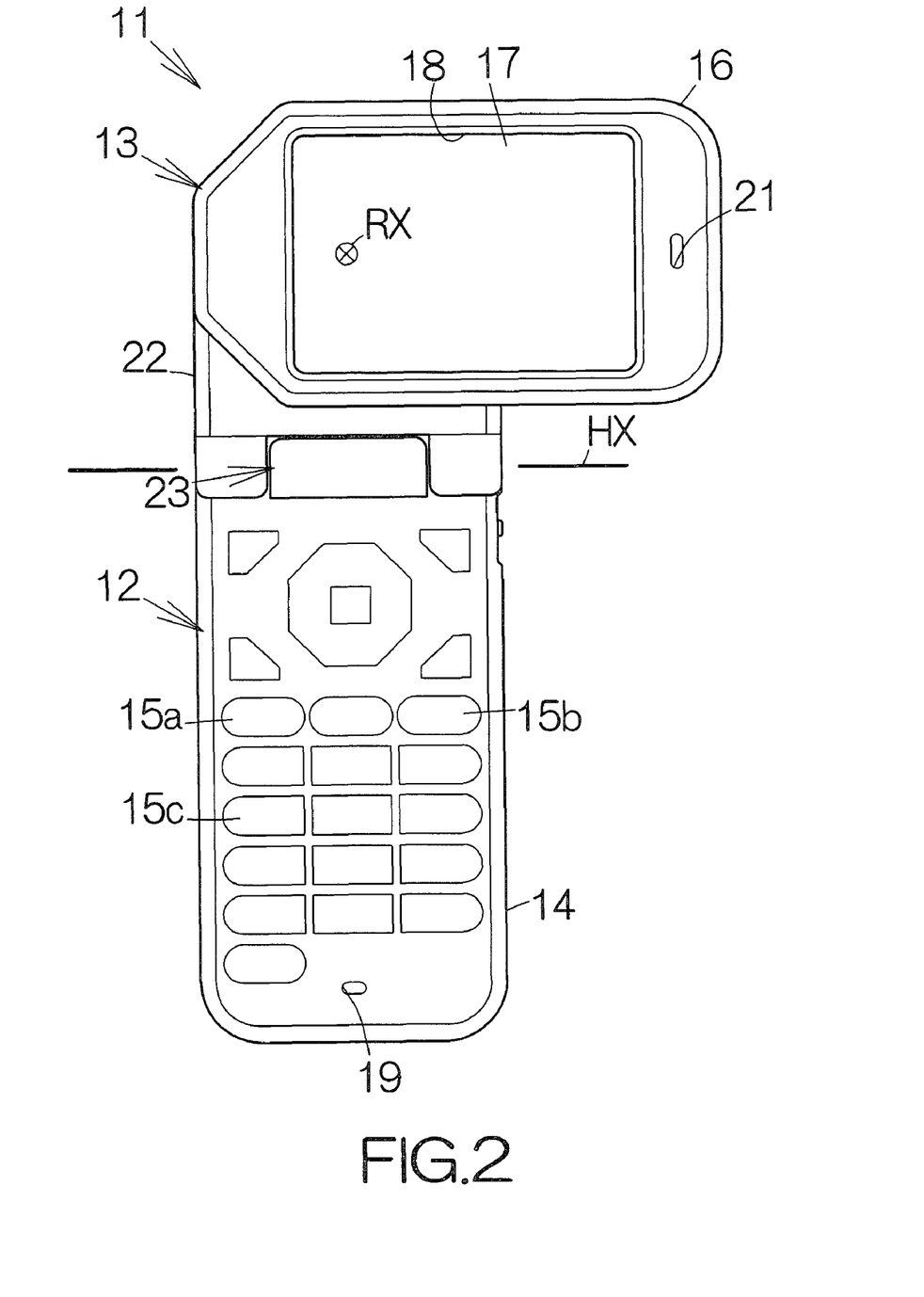
FIG. 2 is a front view schematically illustrating a first pivotal attitude.
Figure 3:
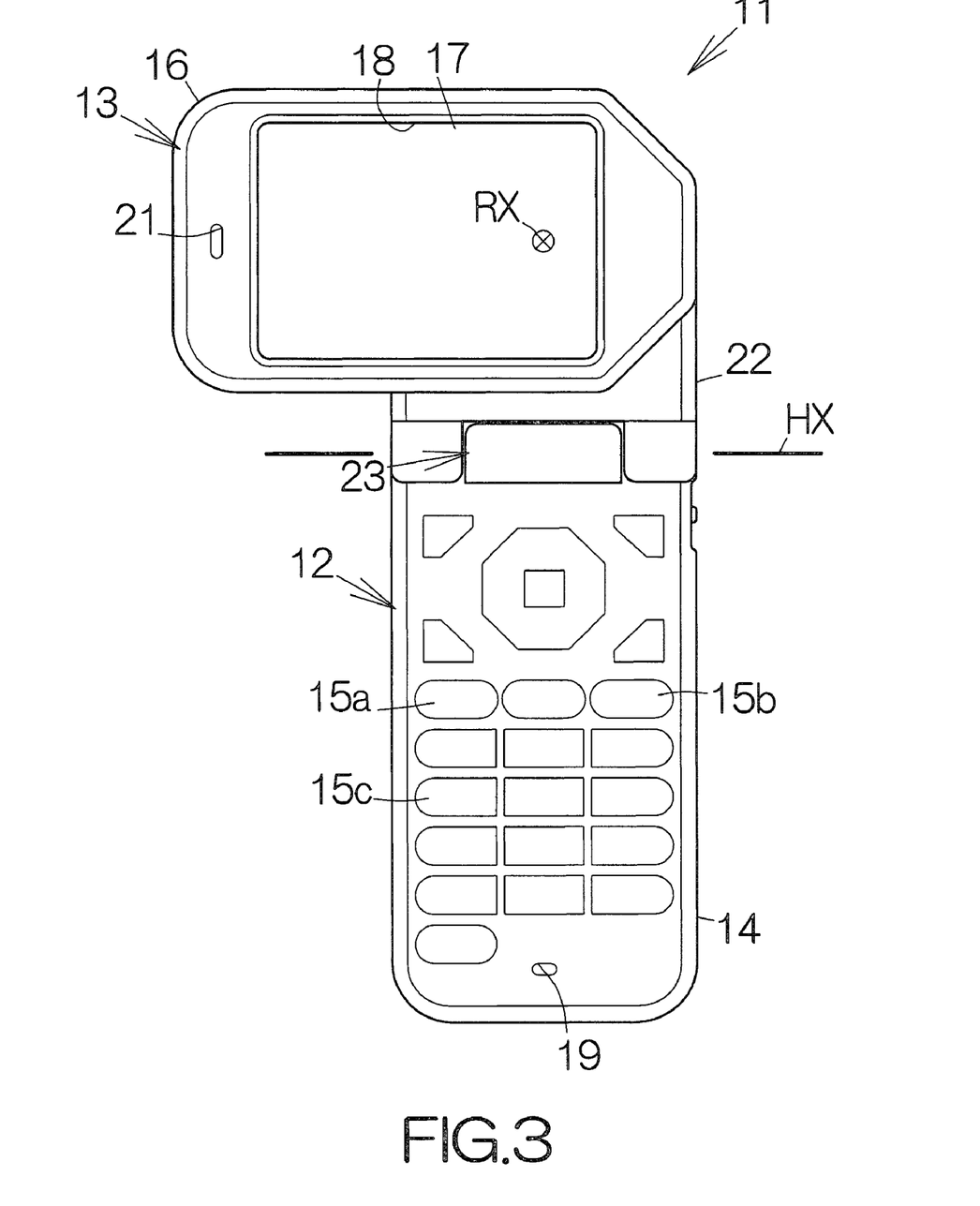
FIG. 3 is a front view schematically illustrating a second pivotal attitude.

When the mobile phone terminal 11 takes the opened attitude, the display enclosure 16 is allowed to rotate around the second rotation axis RX, for example. When the display enclosure 16 rotates in the clockwise direction, namely a first direction, by the rotation angle of 90 degrees, from the upright attitude where the display panel module 17 provides the portrait screen, as shown in FIG. 2, the display enclosure 16 takes a first pivotal attitude. A landscape screen is established in the LCD panel module 17. When the display enclosure 16 rotates in the anticlockwise direction, namely a second direction, by the rotation angle of 90 degrees, from the upright attitude, the display enclosure 16 takes a second pivotal attitude, as shown in FIG. 3. The landscape screen is established in the LCD panel module 17.

Figure 4:
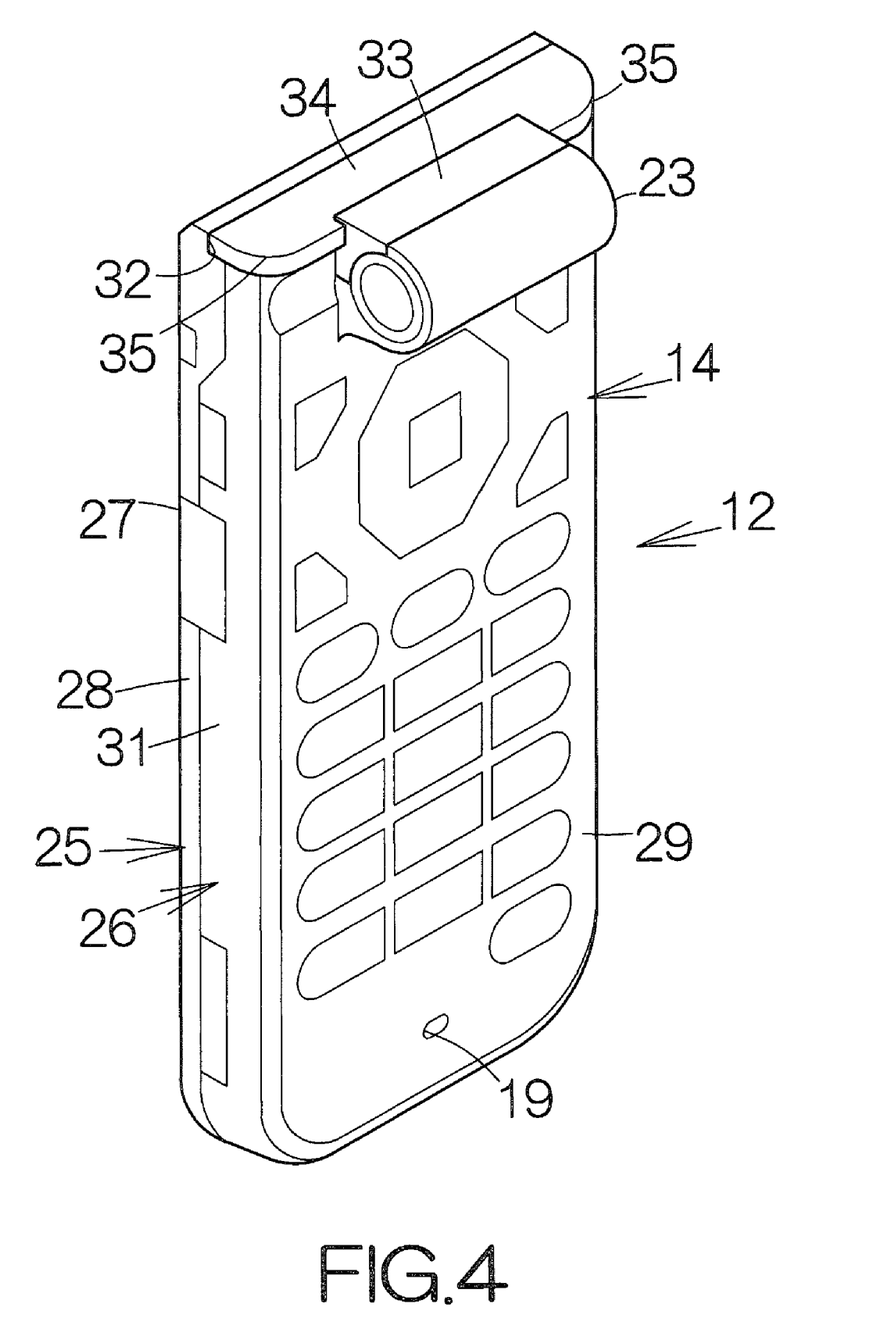
FIG. 4 is a perspective view schematically illustrating a main body enclosure.

As shown in FIG. 4, the main body enclosure 14 includes a lower half 25 and an upper half 26. The lower half 25 defines a surrounding wall 28 standing upright from the periphery of a rear panel 27. The upper half 26 likewise defines a surrounding wall 31 standing upright toward the lower half 25 from the periphery of a front panel 29 opposed to the rear panel 27. The surrounding wall 31 of the upper half 26 is coupled to the surrounding wall 28 of the lower half 25. The main body enclosure 14 serves as an enclosure body according to the present invention.

A depression 32 is formed in the surrounding wall of the main body enclosure 14. The depression 32 extends across the lower half 25 and the upper half 26. A hinge cover 33 and a transparent panel member, namely an IrDA panel 34, are received in the depression 32. The transparent panel member is colored black. The hinge cover 33 covers over the hinge 23 placed on the front panel 29. The hinge cover 33 is molded from a reinforced resin material such as acrylonitrile butadiene styrene (ABS), for example. The IrDA panel 34 provides the end surface of the main body enclosure 14. The IrDA panel 34 defines curved edges 35 along the contour of the end surface of the main body enclosure 14. The IrDA panel 34 is molded from a resin material such as polycarbonate, for example. The IrDA panel 34 has a selective transparency to infrared rays. The IrDA panel 34 may have transparency exclusively to infrared rays.

Figure 5:
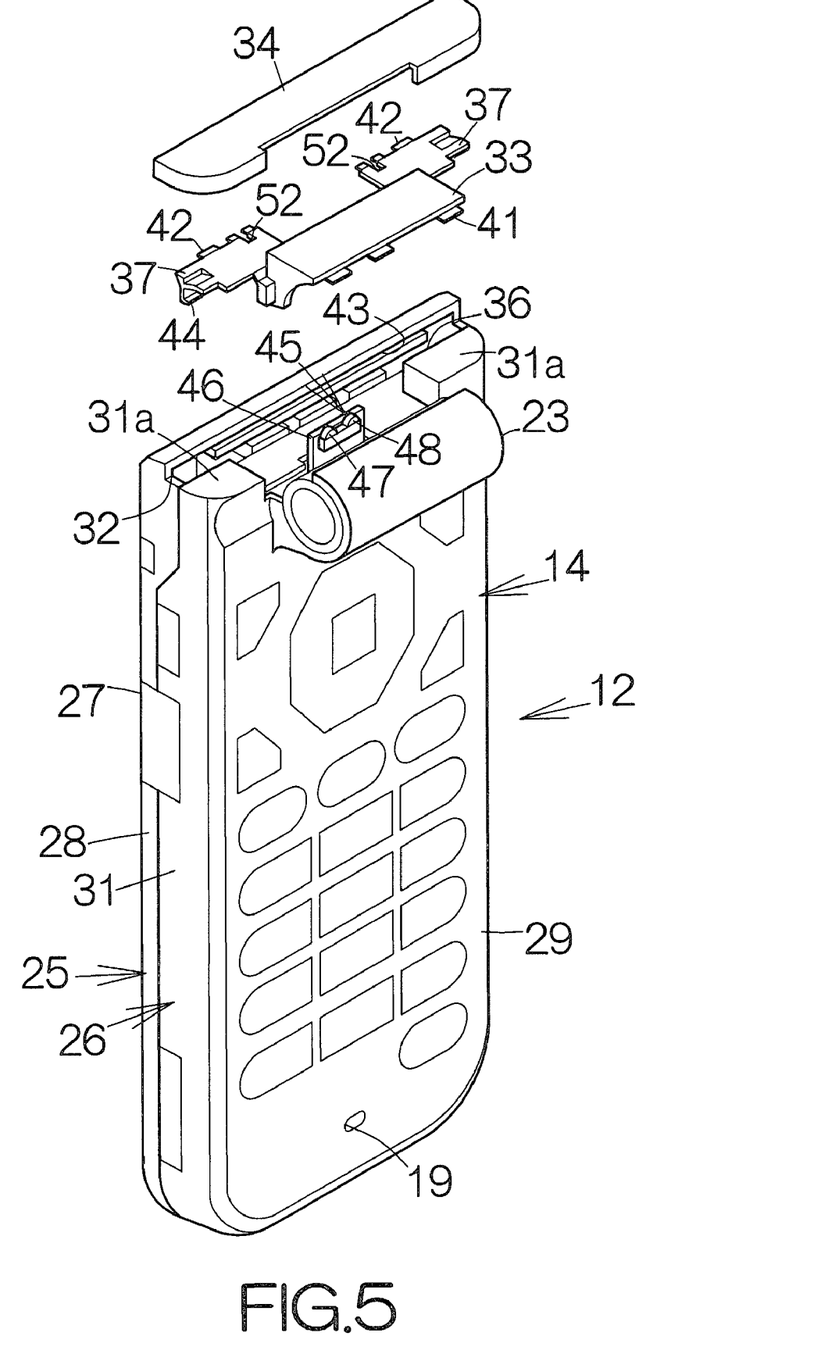
FIG. 5 is a partially exploded view schematically illustrating the main body enclosure.

As shown in FIG. 5, an opening 36 is formed in the main body enclosure 14 within the depression 32. The surrounding wall 31 or end walls 31a of the upper half 26 are placed at locations outside the opposite sides of the opening 36, respectively. Specifically, the opening 36 is located between the end walls 31a. Reinforcing plates 37 are respectively placed on the surfaces of the corresponding end walls 31a, namely the end surface of the upper half 26. The reinforcing plates 37 are placed at positions outside the opposite sides of the opening 36, namely on both the sides of the opening 36, respectively. The reinforcing plates 37 extend to cover the opening 36 at portions near the opposite sides of the opening 36, so that the opening 36 is narrowed. The reinforcing plates 37 and the hinge cover 33 are formed integral with each other as one component. The reinforcing plates 37 extend from the hinge cover 33 toward the lower half 25.

The hinge cover 33 and the reinforcing plates 37 are held between the lower half 25 and the upper half 26. First retaining claws 41 are formed on the hinge cover 33. The first retaining claws 41 are inserted into the hinge 23. Second retaining claws 42 are formed on the reinforcing plates 37, respectively. The second retaining claws 42 are inserted into a groove 43 defined inside the surrounding wall 28 of the lower half 25. The hinge cover 33 and the reinforcing plates 37 can thus be prevented from dropping off from the lower half 25 and the upper half 26.

Provisional retaining claws 44 are also formed on the reinforcing plates 37, respectively. When the reinforcing plates 37 are placed on the surfaces of the corresponding end walls 31a of the upper half 26, respectively, the provisional retaining claws 44 are respectively engaged with the backsides of the corresponding end walls 31a of the upper half 26 around the tops of the corresponding end walls 31a. The hinge cover 33 and the reinforcing plates 37 can in this manner provisionally be held on the upper half 26. Here, the first retaining claw 41 serves as a first claw according to the present invention. The provisional retaining claw 44 serves as a second claw according to the present invention.

An infrared communication module 45 is placed in the opening 36. The infrared communication module 45 is mounted on a printed wiring board 46 incorporated in the main body enclosure 14, for example. The infrared communication module 45 includes a light-emitting element 47 and a light-receiving element 48. The light-emitting element 47 and the light-receiving element 48 are placed in a space between the reinforcing plates 37, 37.

Figures 6, 7:
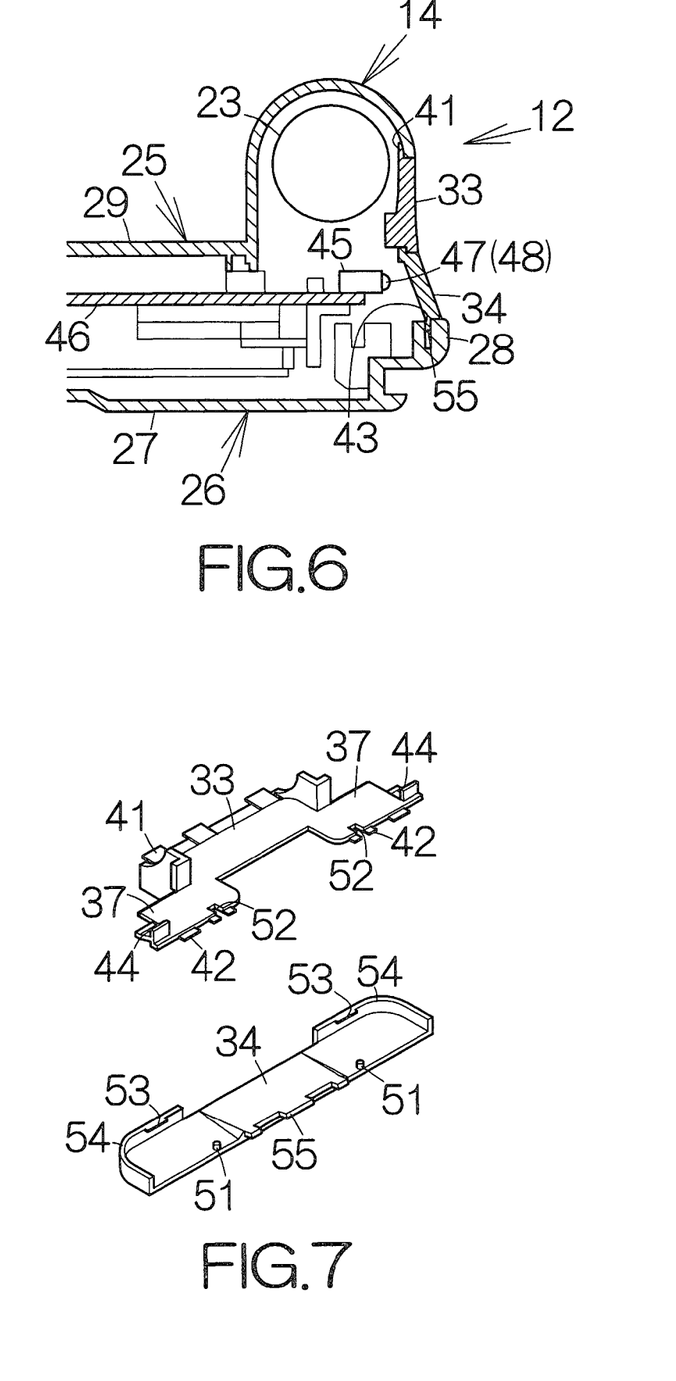
FIG. 6 is a partial sectional view schematically illustrating the main body enclosure.
FIG. 7 is an exploded view schematically illustrating a transparent panel member and a hinge cover.

The IrDA panel 34 is placed on the surfaces of the reinforcing plates 37. The IrDA panel 34 lies over the reinforcing plates 37, 37. The IrDA panel 34 thus closes the opening 36. As shown in FIG. 6, the light-emitting element 47 and the light-receiving element 48 are opposed to the IrDA panel 34 at a distance. The light-emitting element 47 is designed to emit infrared rays to the outside of the main body enclosure 14. The emitted infrared rays penetrate through the IrDa panel 34. The light-receiving element 48 is designed to detect infrared rays running into the main body enclosure 14 from the outside. An infrared communication is realized in this manner.

As shown in FIG. 7, a pair of protrusions 51 is formed on the back surface of the IrDA panel 34. When the IrDA panel 34 is placed on the reinforcing plates 37, the protrusions 51 are received in indents 52 formed in the corresponding reinforcing plates 37, respectively. The indents 52 are defined in the edges of the reinforcing plates 37, respectively. A pair of claws 53 is formed in the back surface of the IrDA panel 34. The claws 53 stand upright from the back surface of the IrDA panel 34. The claws 53 are formed as parts of a surrounding wall 54 standing upright from the back surface of the IrDA panel 34 along the periphery of the IrDA panel 34. When the IrDA panel 34 is placed on the reinforcing plates 37, the reinforcing plates 37 are held between the claws 53 or surrounding wall 54 and the protrusions 51. The tip ends of the claws 53 are engaged with the back surfaces of the corresponding reinforcing plates 37, respectively. The IrDA panel 34 is in this manner provisionally held on the reinforcing plates 37. An extension piece 55 is also formed on the IrDA panel 34. The extension piece 55 is designed to extend in a direction getting far from the claws 53. When the IrDA panel 34 is attached to the main body enclosure 14, the extension piece 55 is inserted into the groove 43 formed inside the surrounding wall 28 of the lower half 25, as is apparent from FIG. 6.

Next, a brief description will be made on a method of attaching the IrDA panel 34 and the hinge cover 33. The first retaining claws 41 of the hinge cover 33 are first inserted into the hinge 23 of the upper half 26. The provisional retaining claws 44 are engaged with backsides of the corresponding end walls 31a around the tops of the corresponding end walls 31a. The hinge cover 33 and the reinforcing plates 37 are in this manner provisionally attached to the upper half 26. The lower half 25 is then coupled to the upper half 26. The second retaining claws 42 of the reinforcing plates 37 are inserted into the groove 43 inside the surrounding wall 28 of the lower half 25.

The claws 53 of the IrDa panel 34 are engaged with the back surface of the corresponding reinforcing plates 37, respectively. The protrusions 51 are received in the indents 52 of the corresponding reinforcing plates 37, respectively. The IrDA panel 34 is positioned relative to the reinforcing plates 37. The IrDa panel 34 is placed on the reinforcing plates 37. The claws 53 of the IrDA panel 34 are inserted into the groove 43 inside the surrounding wall 28 of the lower half 25. The IrDA panel 34 is attached to the main body enclosure 14 for coverage over the opening 36 from the outside of the main body enclosure 14.

The mobile phone terminal 11 enables attachment of the IrDA panel 34 to the main body enclosure 14 for coverage over the opening 36 from the outside of the main body enclosure 14. One is allowed to design the IrDA panel 34 regardless of the shape of the opening 36. This results in a widened variety of design for the main body enclosure 14, namely the mobile phone terminal 11. The IrDA panel 34 is allowed to define the curved edges 35 along the contours of the end walls 31a of the main body enclosure 14, for example. The mobile phone terminal 11 is thus allowed to enjoy an enhanced appearance.

Figure 8:
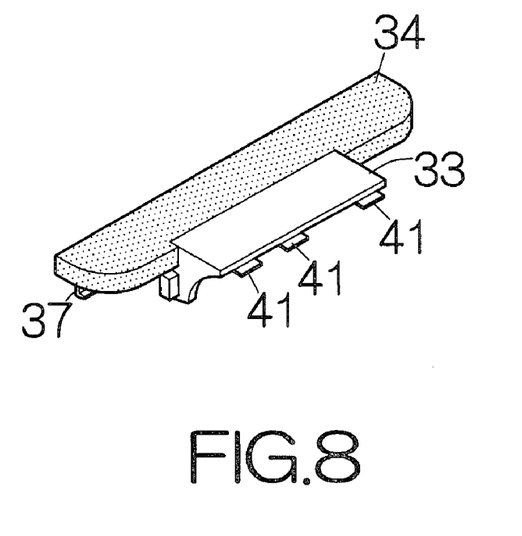
FIG. 8 is a perspective view schematically illustrating a transparent panel member and a hinge cover according to another specific example.

As shown in FIG. 8, coinjection molding may be utilized to form the IrDA panel 34 and the hinge cover 33 as a one-piece component. The IrDA panel 34 may be made of acrylonitrile butadiene styrene (ABS) in the same manner as described above, for example. The hinge cover 33 may be made of polycarbonate in the same manner as describe above, for example. The reinforcing plates 37 may be formed integral with the hinge cover 33. Like reference numerals are attached to the structure and components equivalent to those of the aforementioned example. Utilization of the coinjection molding enables a reduced number of components in the mobile phone terminal 11. This results in simplification in the process for production of the mobile phone terminal 11.

What is claimed is:

1. An enclosure for an electronic apparatus, comprising:
   a lower half defining a surrounding wall standing upright from a periphery of a rear panel;
   an upper half defining a surrounding wall coupled to the lower half and an opening in the surrounding wall, the surrounding wall standing upright toward the lower half from a periphery of a front panel opposed to the rear panel;
   a hinge placed on the front panel;
   a hinge cover covering over the hinge;
   a pair of reinforcing plates extending from the hinge cover to the lower half, the reinforcing plates being placed on the surrounding wall of the upper half on both sides of the opening; and
   a panel member superposed on the reinforcing plates from an outside of the upper half for covering over the opening, the panel member having transparency to infrared rays, the panel member received in a depression formed across the upper half and the lower half.

2. The enclosure according to claim 1, wherein the panel member includes:
   protrusions protruding from a back surface of the panel member; and
   claws each engaged with a back surface of the reinforcing plate, the claws each serving to hold the reinforcing plate against the protrusion.

3. The enclosure according to claim 2, further comprising:
   a first claw formed in the hinge cover, the first claw inserted into the hinge; and
   second claws formed in the reinforcing plates, the second claws each engaged with a backside of the surrounding wall of the upper half around a top of the surrounding wall.

4. The enclosure according to claim 1, wherein the hinge cover is integral with the panel member based on coinjection molding.

5. The enclosure according to claim 4, further comprising:
   a first claw formed in the hinge cover, the first claw inserted into the hinge; and
   second claws formed in the reinforcing plates, the second claws each engaged with a backside of the surrounding wall of the upper half around a top of the surrounding wall.

6. An electronic apparatus comprising:
   a lower half defining a surrounding wall standing upright from a periphery of a rear panel;
   an upper half defining a surrounding wall coupled to the lower half and an opening in the surrounding wall, the surrounding wall standing upright toward the lower half from a periphery of a front panel opposed to the rear panel;
   an infrared communication module placed in a space between the lower half and the upper half, the infrared communication module being opposed to the opening;
   a hinge placed on the front panel;
   a hinge cover covering over the hinge;
   a pair of reinforcing plates extending from the hinge cover to the lower half, the reinforcing plates being placed on the surrounding wall of the upper half on both sides of the opening; and
   a panel member superposed on the reinforcing plates from an outside of the upper half for covering over the opening, the panel member having transparency to infrared rays, the panel member received in a depression formed across the upper half and the lower half.

7. The electronic apparatus according to claim 6, wherein the panel member includes:
   protrusions protruding from a back surface of the panel member; and
   claws each engaged with a back surface of the reinforcing plate, the claws each serving to hold the reinforcing plate against the protrusion.

8. The electronic apparatus according to claim 7, further comprising:
   a first claw formed in the hinge cover, the first claw inserted into the hinge; and
   second claws formed in the reinforcing plates, the second claws each engaged with a backside of the surrounding wall of the upper half around a top of the surrounding wall.

9. The electronic apparatus according to claim 6, wherein the hinge cover is integral with the panel member based on coinjection molding.

10. The electronic apparatus according to claim 9, further comprising:
    a first claw formed in the hinge cover, the first claw inserted into the hinge; and
    second claws formed in the reinforcing plates, the second claws each engaged with a backside of the surrounding wall of the upper half around a top of the surrounding wall.

* * * * *